United States Patent [19]

Jacobone

[11] 4,374,896
[45] Feb. 22, 1983

[54] COATINGS FOR POLYOLEFINIC PRODUCTS AND PRODUCTS COVERED BY SAID COATINGS

[76] Inventor: Donato Jacobone, Via Borgonuovo, 18 Milan, Italy

[21] Appl. No.: 973,804

[22] Filed: Dec. 28, 1978

[30] Foreign Application Priority Data

Jan. 10, 1978 [IT] Italy ............................ 19109 A/78

[51] Int. Cl.³ ..................... B32B 27/00; C09J 7/02
[52] U.S. Cl. ................................ 428/349; 428/347; 428/480; 428/518; 428/520
[58] Field of Search ............... 428/480, 483, 518, 520, 428/347, 349; 260/862, 31.2 XA, 33.2 R, 32.8 R

[56] References Cited

U.S. PATENT DOCUMENTS

| | | | |
|---|---|---|---|
| 3,033,707 | 5/1962 | Lacy et al. | 428/510 X |
| 3,202,528 | 8/1965 | James | 428/518 X |
| 3,262,808 | 7/1966 | Crooks et al. | 428/518 X |
| 3,347,697 | 10/1967 | Gmitro | 428/518 X |
| 3,353,991 | 11/1967 | Shelburg | 428/518 |
| 3,485,653 | 12/1969 | Hermitte et al. | 428/349 |
| 3,488,211 | 1/1970 | Morrison | 428/518 |
| 3,513,055 | 5/1970 | Brader, Jr. et al. | 428/518 X |
| 3,700,624 | 10/1972 | Adachi et al. | 260/862 X |
| 3,780,141 | 12/1973 | Jin et al. | 260/862 X |
| 3,958,065 | 5/1976 | Ranck | 428/349 |
| 4,049,747 | 9/1977 | Jin et al. | 260/862 X |

FOREIGN PATENT DOCUMENTS 717612 10/1966 Italy .

*Primary Examiner*—Lorraine T. Kendell
*Attorney, Agent, or Firm*—McGlew and Tuttle

[57] ABSTRACT

A coating composition for polyolefinic products, particularly films, which consists essentially of a solution of a three-component polymeric system comprising:
(a) a vinyl or vinylidene copolymer;
(b) a polymer or copolymer of acrylic esters; and
(c) a polyester resin obtained by condensation.

The coated products and the coating process are also described.

4 Claims, No Drawings

COATINGS FOR POLYOLEFINIC PRODUCTS AND PRODUCTS COVERED BY SAID COATINGS

BACKGROUND OF THE INVENTION

The present invention relates to new coatings for polyolefinic films, particularly but not exclusively, for polypropylene films and further relates to films and the like covered by said coatings, especially for rendering said films thermosealable by conventional packaging and sealing machines.

Polyolefinic films in general, and isotactic polypropylene films in particular, have experienced in the recent years a notable development especially in the field of sealed bag packaging and in general in the automated packaging field.

The present films have been used in particular as replacement of the regenerated cellulose films, generally known as "Cellophane" films, as alternates but also often as substitutes to thin polyvinylchloride films with respect to which they offer numerous advantages.

Cellophane, as is well known, has been up to few years ago one of the most widely used materials in the field of flexible packaging for the food industry.

Often, in order to improve cellophane performance, it is necessary to treat the film with thermoplastic resins which serve to improve the sealability of two or more films with each other in a packaging machine. But, above all, said coatings served to form an effective barrier for gases and water vapor to which all cellulose derivatives are particularly sensitive. The above-described treatment is easily effected utilizing well knows systems of coating or the like, using for example coatings of the following compositions:

| | |
|---|---|
| "Saran" - PVDC | (dispersion or solution) and its copolymers |
| PVC | (dispersion or solution) and its copolymers |
| Nitrocellulose | (with various resins) |

The application of the coatings described does not present any particular difficulties due to the very good thermal properties of the regenerated cellulose.

Plastic films, in general, and in particular to mono- or bi-oriented (biaxially drawn) polypropylene films, though possessing better physico-mechanical characteristics than cellophane, are very sensitive to temperatures higher than 110° C. and are less stable thermally than cellophane.

Consequently, they are more difficult to heat-seal, requiring special apparatus.

Therefore, the coating of said polypropylene films must above all eliminate their thermosealability deficiencies and thus permit the sealing thereof at temperatures lower than those at which the polypropylene may experience the adverse effects of rippling, tightening, melting, degradations and the like.

To achieve this result, the polypropylene film (hereinafter referred to as "PP films") are coated using procedures similar to those used for cellophane, but modified and improved to account for the different behavior of the material being treated.

Among the materials most widely used for the coating of said PP films are vinyl resins and their copolymers, vinylidic resins and their copolymers, acrylic resins and their copolymers or mixtures of the above resins in varying proportions. The above resins are applied onto the PP film either as solutions in a suitable solvent or as dispersions or emulsions.

The major difficulty in coating the PP base film consists in obtaining a good adhesion of the coating to the base films. In fact, a routine coating operation could result in very low sealability values due to the delamination of the coating. In order to increase the mechanical resistance of the seals, there are certain treatments to which the base film is subjected to before the coating operation. The precoating treatments known at this time are: electric discharge treatment (corona effect), flame treatment, treatment with oxidizing solutions (impractical because of processing difficulties) and, finally, treatment with a suitable primer, preferably effected in in conjunction with the above-mentioned surface treatments. The flame or corona treatments are easily performed and have a definite effect in improving the wettability of the base film. Among the primers, the better and most practical, and consequently the one most often used, is a water-soluble polyimine compound, used for some time in the paper industry and in the manufacturing industry in the production of flexible plastic film articles consisting of combinations of plastic film with aluminum, paper and cellophane.

The techniques of the above-mentioned technologies have already been used in the field of isotactic polyethylene films and there exist, in this regard, some patents to various companies in this field. Among these, a patent (Italian Pat. No. 717,612, filed on Mar. 16, 1964); to Montecatini discloses a process for obtaining coated films (called "Moplefan") consisting substantially of a base film of polypropylene high in isotactic content. The base film is subjected to a flame treatment and to a corona discharge treatment as above described. After said treatment, there is applied on the base film a polyimine-based primer. The treated film is then covered with a coating consisting of a mixture of, substantially, three basic components. In the patent there is claimed the effect of the oxiranic group contained in the epoxy resin for improving the adhesion of the coating to the support base. There are also known other commercial products, such as "Prophan", having thermosealability characteristics similar to those of Moplefan. There also exist alternate processes which utilize different technologies, such as coupling and lamination of thin film, which also require the use of primers, adhesives and/or hot melts for the coupling of said films with a previously extruded film or with a molten layer. Also in this case, the effectiveness of polyimine as an adhesion promoter is known.

It must also be appreciated that the product, in addition to the thermosealability characteristics, must also have other characteristics no less important such as: good optical transparency, no tackiness above 45/60° C., stability to aging, cohesion of the sealed film immediately after the opening of the sealing bars, easy separation from the sealing bars, minimum value of friction coefficient, low solvent retention, resistance to greases and fats, good printability, impermeability to gases, etc. Furthermore, in applications in the alimentary field, said films must comply with the existing standards in the field. In view of these facts, in the resin compositions there exist, for each type of base formulation, modifiers and additives which must be dosed and chosen as to optimize the distribution of values of the characteristics required for each specific application.

DESCRIPTION OF THE INVENTION

Taking into consideration all these implications, applicant has studied and developed a resin mixture for coating purposes, alternate to that described in the Moplefan patent (Italian Pat. No. 717,612 filed Mar. 16, 1964), said mixture being characterized by the fact that one of its main components is represented by a saturated and/or unsaturated polyester-type polymer, free of styrene. In particular, said mixture is characterized by the fact of providing the following alternative three-component polymeric system compositions: vinyl copolymers (PVC/PVA in ratios of from 70/30 to 90/10), polymers and copolymers of acrylic esters, and polyester resins obtained by condensation; an alternate mixture is composed of vinylidene copolymers (PVDC/PVC/AN in ratios varying between 80/10/10, 90/5/5 and 90/0/10), polymers and copolymers of acylic esters, and polyester resins obtained by condensation. The products according to the present invention, in particular mono-, bi- and non-oriented polypropylene films covered with the coatings of the invention, are essentially characterized by the fact of providing a first layer of preparation or of adhesion (primer layer) to which is then applied the actual coating. Said two covering layers are essentially composed of (all the percentages being indicated as weight percent of the dry polymer mixture, unless otherwise indicated):

(A) First or primer layer-composed by alkyleneimine polymers such as polyethyleneimine, polypropyleneimine or the like.

(B) Second or coating layer-composed of polymers and copolymers of: vinyl chloride, vinylidene chloride, vinyl acetate, acrylonitrile, and esters and hemiesters of maleic, fumaric, acrylic, methacrylic, crotonic, and itaconic acid and their anhydrides. To said polymers or copolymers, it is possible to add or substitute therefor homo- and/or copolymeric acrylic resins of acrylic acid, methacrylic acid and their alkyl esters.

Said polymers or copolymers are admixed with homopolymers and copolymers based on acrylic, methacrylic, crotonic, and itaconic acid and their aliphatic $C_1$-$C_{14}$ esters and their isomers; or said polymers or copolymers may be admixed; with hydroxyalkyl esters of said acids containing from 1 to 12 carbon atoms and having the hydroxy group on a primary or secondary carbon atoms, and further with hydroxyalkyl esters derived from hydroxy polyethers.

For this application, the resin mixture is dissolved in suitable solvents, such as ketones, ethylene glycol ethers, acetic acid esters and mixtures thereof, in a weight percent ratio of from 20–40%.

To improve the adhesion of the layer applied in the above-described formulation, a polyester-type polymer in a ratio of from 1 to 50% is added.

The polyesters can be of various types such as, for example, esterification products of phthalic, terephthalic, isophthalic acids and their anhydrides with aliphatic glycols having a $C_2$-$C_8$ chain and their isomers and/or with ethylene glycol ethers such as diethylene or triethylene glycol; the dibasic acids above-mentioned esterified with polyglycols containing three or more primary or secondary hydroxy groups, which hydroxy groups may be partially defunctionalized with monocarboxylic acids such as benzoic acid, para-t-butylbenzoic acid, and fatty acids; polyester resins formed totally or partially by basic aliphatic acids having a $C_2$-$C_9$ chain with the above-indicated glycols and polyglycols; polyesters obtained from dibasic and polybasic aromatic and aliphatic acids defunctionalized with monofunctional alcohols and subsequently esterified with glycols and polyglycols defunctionalized with monocarboxylic acids, or substituting part of said glycols with aminoalcohols, such as triethanolamine; polyesters obtained by the condensation between isocyanates or mono-, bi- or polyfunctional isocyanate adducts with glycols and polyglycols eventually defunctionalized as already indicated in the preceding examples; polyesters obtained by the condensation of dibasic aliphatic and aromatic acids and their methyl esters with ethylene oxide or propylene oxide. The coating formulation thus prepared can be further modified by the addition of suitable agents, such as release, antistatic and wetting agents, pigments and fillers, in order to obtain the desired properties for the particular use.

There now follow the illustrative examples:

EXAMPLE 1

Base film:

polypropylene film of high isotactic polymeric content, axially bioriented and surface-treated with an electronic and/or flame system as to obtain a minimum wettability of 36 dynes/cm.

First or primer coat:

One of the faces of the film is coated with an aqueous polyimine solution having a 1–2% dry content.

Coating:

the layer thus obtained is dried and is then coated with a coating solution of 20–35% polymers in methylethylketone. Said coating solution contains the following types of polymers:

(1) A vinyl copolymer based on vinyl chloride/vinyl acetate having a Fikentscher constant (K)=30+35, in a proportion equal to 70% of the mixture components.

(2) A polyester resin obtained by the condensation of phthalic anhydride/maleic anhydride in a ratio of 1–1.5 with ethylene glycol, in a proportion equal to 15% of the mixture.

(3) an acrylic copolymer based on methylmethacrylate/butylmethacrylate having a viscosity HU, measured at 25° C. and at a 30% concentration in xylene, of 50–150 cps, in a concentration equal to 15% of the mixture.

Characteristics:

after coating, the dried film had the following characteristics:

| | |
|---|---|
| coating thickness | = 1.0 – 2.0μ |
| transparency | = good (HAZE < 2) |
| sliding qualities | = good |
| resistance to sealing | = 300–400 g/cm. |

The resistance to sealing was measured by examining two coated films sealed with each other at 120° C., with a sealing bars pressure between 1.5 and 3 kg/cm² and a pressure application time of 1 second.

EXAMPLE 2

Base film:

polypropylene film of high isotactic polymeric content, axially bioriented and surface-treated with electronic and/or flame system as to obtain a minimum wettability of 36 dynes/cm.

First or primer coat:

One of the faces of the film is coated with an aqueous polyimine solution having a 1-2% dry content.
Coating:
the primer coat is dried and is then coated with a coating solution of 20-35% polymer mixture in methylethylketone. Said coating solution contains the following polymers:

(1) A vinyl copolymer based on vinyl chloride/maleic esters having a Fikentscher constant (K)=35, in a proportion of 70% of the mixture.

(2) A polyester resin obtained by the condensation of phthalic anhydride/maleic anhydride in a ratio of 1-1.5 with ethylene glycol, in a proportion of 15% of the mixture.

(3) An acrylic copolymer based on methylmetacrylate/butylmetacrylate having viscosity HU, measured at 25° C. and at a 30% concentration in xylene, of 50-150 cps, in a proportion of 15% of the mixture.

Characteristics:
after the coating operation, the dried film has the following characteristics:

| | |
|---|---|
| coating thickness | = 1.0 ÷ 2.0μ |
| transparency | = good (HAZE < 2) |
| sliding qualities | = good |
| resistance to sealing | = 300-400 g/cm. |

The resistance to sealing was measured by examining two coated films sealed to each other at 120° C., at a sealing bar pressure of 1.5 to 2 kg/cm² and for a pressure application time of 1 second.

EXAMPLE 3

Film base:
polypropylene film as in Ex. 1.
First or primer coat:
polyimine solution as in Ex. 1.
Coating:
the primer layer is dried and is then coated with a coating solution of 20-35% polymer mixture in methylethylketone. Said coating solution contains the following polymers:

(A) A vinyl copolymer based on vinyl chloride/vinyl acetate having a Fikentscher constant (K)=40, in a proportion of 70% of the mixture.

(B) A polyester resin obtained by the condensation of phthalic anhydride/maleic anhydride in a ratio of 1-1.5 with ethylene glycol, in a proportion of 15% of the mixture.

(C) An acrylic copolymer based on methylmetacrylate/butylmethacrylate having a viscosity HU, measured at 25° C. and at a 30% concentration in xylene, of 90-150 cps in a proportion of 15% of the mixture.

Characteristics:
after the coating operation, the dried film had the following characteristics:

| | |
|---|---|
| coating thickness | = 1.0 ÷ 2.0μ |
| transparency | = good (HAZE < 2) |
| sliding qualities | = good |
| resistance to sealing (determines as in Ex. 1) | = 250-350 g/cm |

EXAMPLE 4

Film base:
polypropylene film as in Ex. 1.
First or primer coat:
polyimine solution as in Ex. 1.
Coating:
the primer coat is dried and is then coated with a coating solution of 20-35% polymer content in methylethylketone. Said solution contains the following polymers:

(1) A vinyl copolymer based on vinyl chloride/vinyl acetate having a Fikentscher constant (K)=30, in a proportion of 70% of the mixture.

(2) A polyester resin obtained by the condensation of isophthalic acid/fumaric acid in a ratio equal to 1.5 with ethylene glycol, said resin having the following characteristics:

| | |
|---|---|
| acid number (ASTM D664) | 20 mg KOH/g |
| viscosity at 20° C. (solution 5% TL) | 100-300 cps (DIN 53015) |
| melting point (DIN 53181) | 100-103° C. |

Said resin is employed in a proportion of 15% of the mixture.

(3) An acrylic copolymer based on methylmethacrylate/butylmethacrylate having a viscosity HU, measured at 25° C. and at a 30% concentration in xylene, of 50 to 150 cps, in a proportion of 15% of the mixture.

Characteristics:
after the coating operation, the dried film has the following characteristics:

| | |
|---|---|
| coating thickness | = 1.0 − 2.0μ |
| transparency | = very good (HAZE < 1) |
| sliding qualities | = good |
| resistance to sealing (measured as described in Ex. 1) | = 350-450 g/cm |

What is claimed is:

1. A thermosealable coating composition for isotactic polypropylene film products which consists essentially of a solution of a three-component polymeric system as follows:
    (a) a first component selected from the group consisting of vinyl copolymer (PVC/PVA) in a relative monomer weight percent ratio between about 70/30% and 90/10%;
    (b) a second component selected from the group consisting of polymers and copolymers of acrylic esters and mixtures thereof; and
    (c) a third component consisting of a polyester resin obtained by condensation and being present in a weight percent ratio of from about 1-50% of the polymeric system.

2. The thermosealable coating composition of claim 1, obtained by dissolving the polymeric mixtures, in a weight percent ratio of about 20-40%, in a solvent selected from the group consisting of ketones, ethylene glycol ethers, acetic acid esters and mixtures thereof.

3. A process for coating polypropylene films by applying to one of the faces of said film the coating composition of claim 1.

4. As new industrial products, thermosealable polypropylene films coated with a composition consisting essentially of a solution of a dry polymeric system comprising:
    (a) a first component consisting of a vinyl copolymer (PVC/PVA) in a relative monomer ratio between about 70/30% and 90/10%;
    (b) a second component selected from the group consisting of polymers and copolymers of acrylic esters and mixtures thereof; and
    (c) a third component consisting of a polyester resin obtained by condensation and being present in a ratio of from about 1-50% of the polymeric system.

* * * * *